United States Patent [19]

Petrén

[11] Patent Number: 4,465,413
[45] Date of Patent: Aug. 14, 1984

[54] CARGO RETAINER

[75] Inventor: Rolf A. M. Petrén, Hovås, Sweden
[73] Assignee: NP Marketing Corporation, Neenah, Wis.
[21] Appl. No.: 359,200
[22] Filed: Mar. 18, 1982
[51] Int. Cl.³ .............................................. B61D 45/00
[52] U.S. Cl. ..................................... 410/94; 206/386; 280/43.24; 280/475
[58] Field of Search ................. 410/94, 121, 129, 142, 410/146, 156; 280/475, 43.14, 43.24; 206/386

[56] References Cited

U.S. PATENT DOCUMENTS

| 2,885,070 | 5/1959 | Terlecky et al. | 410/94 |
| 3,181,891 | 5/1965 | Moats | 280/475 |
| 4,147,112 | 4/1979 | Green et al. | 410/94 |
| 4,200,046 | 4/1980 | Koliba et al. | 410/94 |

Primary Examiner—Richard A. Bertsch
Attorney, Agent, or Firm—Andrus, Sceales, Starke & Sawall

[57] ABSTRACT

The cargo retainer comprises a floor contacting member having an upwardly facing load bearing surface which is adapted to project forwardly beneath the cargo load and an upright member secured to the floor contacting member in spaced relation from the forward end of the floor contacting member for engaging with the face of the cargo load. Transversely spaced wheels are rotatably mounted adjacent to the rear end of the floor contacting member and are out of contact with the floor when the floor contacting member of the cargo retainer is resting on the floor. The wheels engage with the floor for wheeled maneuvering of the retainer only when the forward end of the floor contacting member is raised relative to the floor. Further, the upright member is vertically extendible to accommodate load heights exceeding the normal height of the retainer unit. Also, the upright member is collapsible or foldable down onto the floor contacting member to adapt the retainer units for stacking to conserve space during storage and deadhead transport.

13 Claims, 11 Drawing Figures

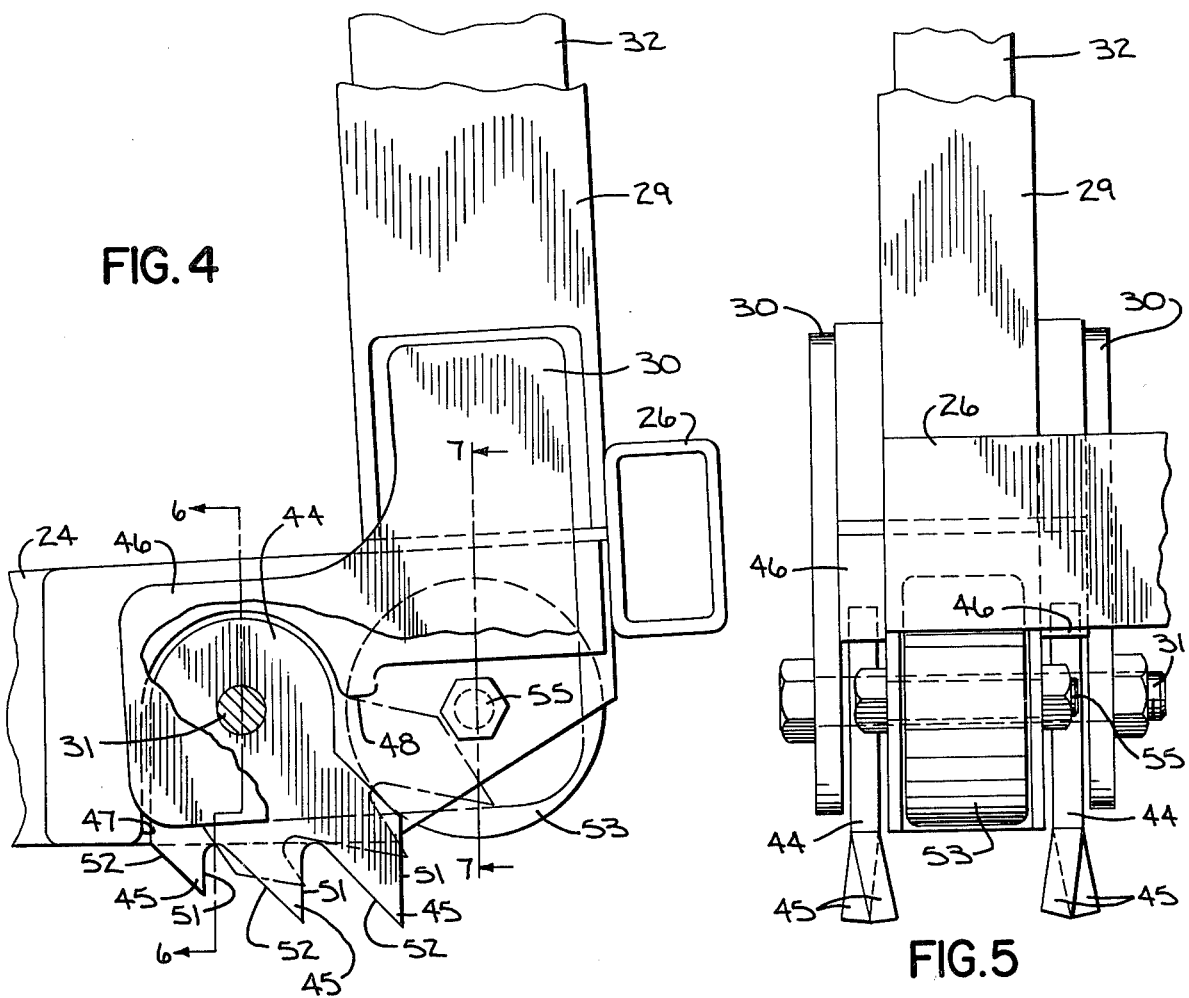
FIG. 4
FIG. 5
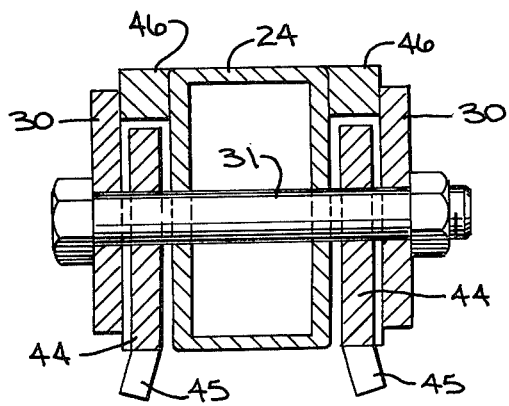
FIG. 6
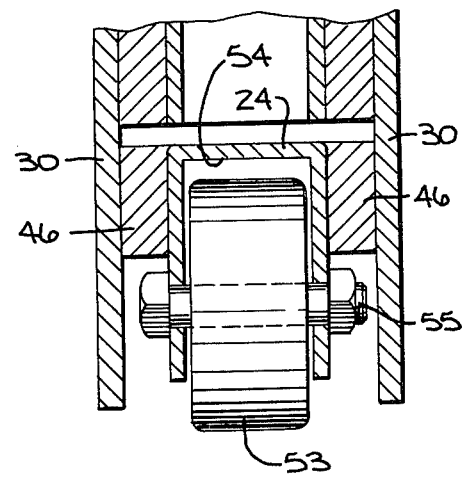
FIG. 7

CARGO RETAINER

BACKGROUND OF THE INVENTION

This invention relates to a cargo retainer for generally maintaining the integrity of a cargo load both as to its compactness and its location within a hold or carrier.

The assignee of this application also owns U.S. Pat. No. 4,317,645 for a Cargo Retainer. The patent relates to a generally L-shaped restraining device for maintaining the integrity of a cargo load and comprises a floor contacting member having an upwardly facing load bearing surface and which projects forwardly beneath a portion of the cargo load. The restraining device also includes a generally upright member that is secured to the floor contacting member in spaced relation from the forward end of the floor contacting member for engaging with the cargo load. The device further includes a floor piercing element which is movably mounted on the floor contacting member adjacent to the rearward end thereof and is normally disposed to pierce the floor when the floor contacting member is under load and is movable to a position incapable of piercing the floor when the restraining device is out of service.

The devices generally shown and described in U.S. Pat. No. 4,317,645 were tested under the auspices of and approved for service by the American Association of Railroads. Thus, utilization of the retainer devices will generally eliminate the need for costly and timeconsuming banding, blocking and bracing. The devices of U.S. Pat. No. 4,317,645, however, are only generally suited to relatively heavy products stacked to a limited height. They are especially appropriate for example in the restraining of cargo loads comprising relatively heavy bagged materials such as neoprene and salt.

This invention is generally in the nature of an improvement upon the cargo retainer of U.S. Pat. No. 4,317,645, and has for an object to generally extend the range of service for such devices. A further object of the present invention is to make the devices maneuverable so that when out of service, one individual can handle and move the devices. A still further object of the present invention is to make the devices collapsible and thus readily stackable for storage and deadhead transport.

SUMMARY OF THE INVENTION

The cargo retainer of this invention generally includes a floor contacting member provided with an upwardly facing load bearing surface and which is adapted to project forwardly beneath the cargo load. The retainer further includes a generally upright member which is secured to the floor contacting member in spaced relation from the forward end of the floor contacting member for engaging with the cargo load. Transversely spaced wheels are rotatably mounted adjacent to the rear of the floor contacting member. The wheels are disposed out of contact with the floor when the floor contacting member is resting on the floor and engageable with the floor for wheeled maneuvering of the cargo retainer when the forward end of the floor contacting member is raised relative to the floor.

According to further aspects of the invention, the generally upright member of the cargo retainer is vertically extendible to accommodate cargo loads that exceed the normal height of the upright member. The cargo retainer is also collapsible by folding the generally upright member down onto the floor contacting member to adapt the retainers for stacking to conserve space during storage and deadhead transport.

DESCRIPTION OF THE DRAWING FIGURES

The drawings furnished herewith illustrate the best mode presently contemplated for the invention and are described hereinafter.

In the drawings:

FIG. 4 is an enlarged partial side elevation with parts broken away and sectioned and shows the mounting of the floor piercing elements and wheels to the floor contacting member of the cargo retainer of this invention;

FIG. 5 is an enlarged partial rear elevation showing details of the mounting of the floor piercing elements and wheels of the cargo retainer;

FIG. 6 is a sectional view taken generally on line 6—6 of FIG. 4;

FIG. 7 is a sectional view taken generally on line 7—7 of FIG. 4;

DESCRIPTION OF THE ILLUSTRATED EMBODIMENT

Figure 11:
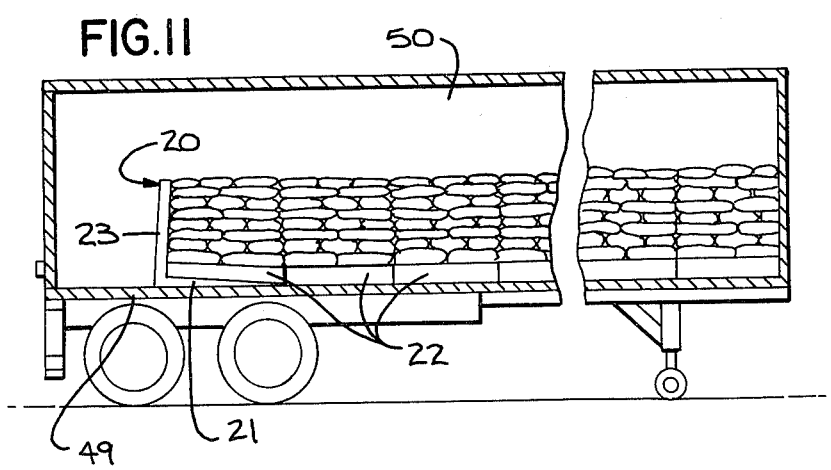
FIG. 11 is a sectional elevation view of a loaded truck trailer wherein cargo retainers are utilized to restrain the cargo load.

Referring to the drawings, the cargo retainer 20 comprises a generally L-shaped unit when placed in service. FIG. 11 shows the cargo retainer in service with the floor contacting member 21 disposed beneath the end pallet 22 of a cargo load and the upright member 23 engaged against the corresponding end of the load to generally maintain the integrity of the cargo load both as to its compactness and location within a carrier or other hold during transport.

The floor contacting member 21 of the retainer 20 generally comprises three (3) transversely spaced legs 24 having a box-section and tapering vertically toward the forward end of lesser vertical dimension and remote from the connection for the upright member 23. Forwardly, the legs 24 are connected by an angle iron brace 25 that extends generally to the full width of the retainer 20. Rearwardly the several legs 24 terminate with a downwardly open channel section and are connected by a box-section brace 26 that projects upwardly above the upper surface of the legs and extends generally to the full width of the retainer 20. Intermediate the fore and aft braces 25 and 26, the legs 24 are further reinforced by transverse cross braces 27 that extend between the respective outer legs and the central leg. With member 21 resting on the floor, the rear box-section brace 26 and the intermediate cross braces 27 are spaced sufficiently off the floor to provide for engagement thereunder by the lifting forks of a forklift truck or other lifting conveyance. The outer legs 24 may be provided with longitudinally spaced hand hold projections 28 that project outwardly and provide for reasonably safe carrying and stacking of the relatively heavy cargo retainers 20 by a pair of individuals in opposed relation.

Figure 1:
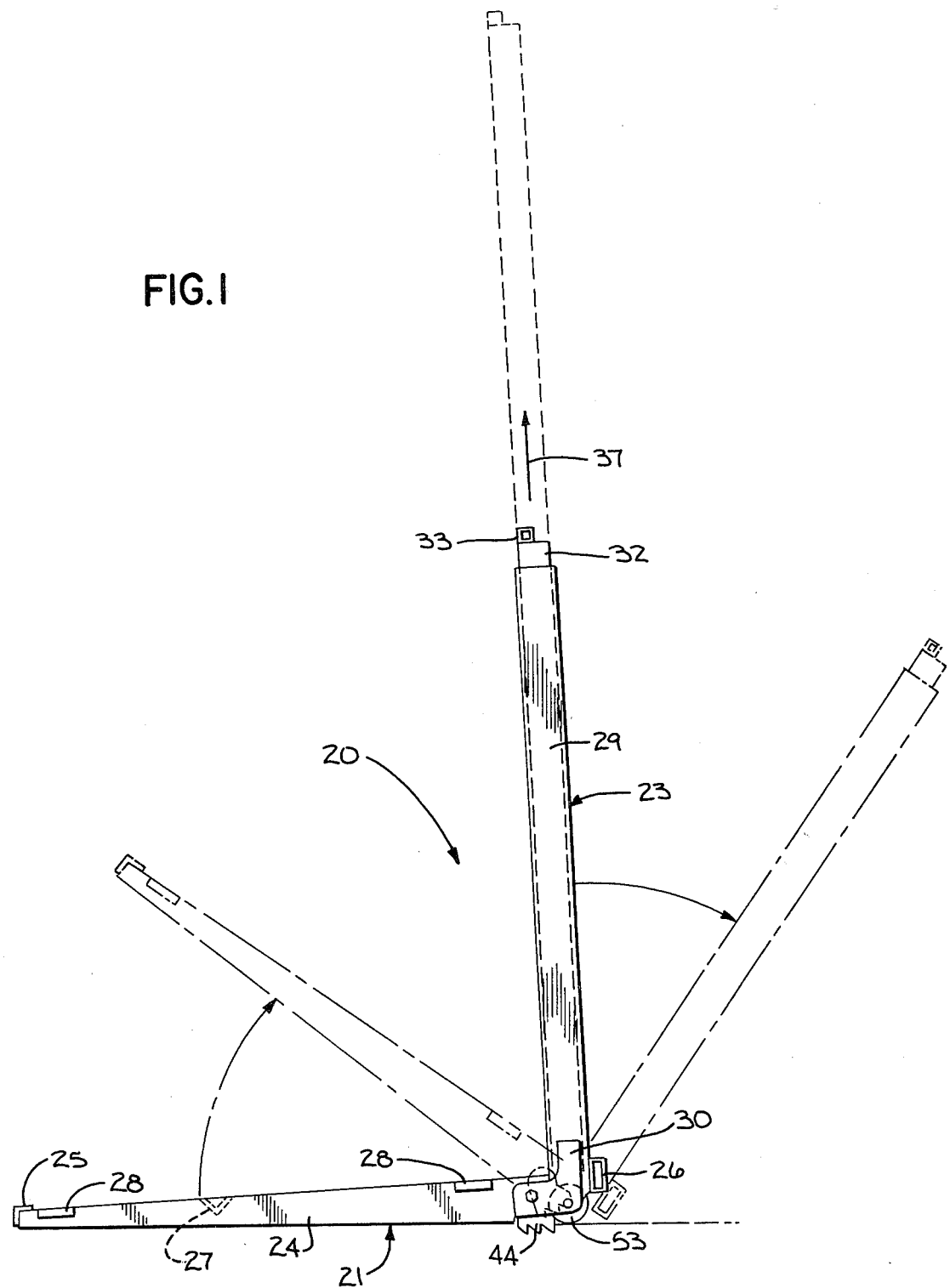
FIG. 1 is a side elevational view of the cargo retainer of this invention which in dashed lines shows the vertically extendible nature of the upright member, and in dot-dash lines shows the retainer oriented for over-the-floor wheeled transport.

In position for service, the upright member 23 extends generally at a right angle to the upper tapered surface of the floor contacting member 21 and thus leans somewhat forwardly as generally shown in FIG. 1. The upright member 23 generally comprises three (3) transversely spaced tubular members 29 that correspond generally to the legs 24 of member 21. The respective tubular members 29 are each carried by a pair of transversely spaced, generally L-shaped plates 30 having their upwardly projecting leg portions secured to the transversely opposed sides of the lower end portions of the tubular members. The lower horizontally projecting leg portions of the opposed plates 30 on each tubular member 29 are pivotally mounted on cross pins 31 and on the opposed sides of the corresponding legs 24 of member 21 as will be further described hereinafter.

Figure 2:
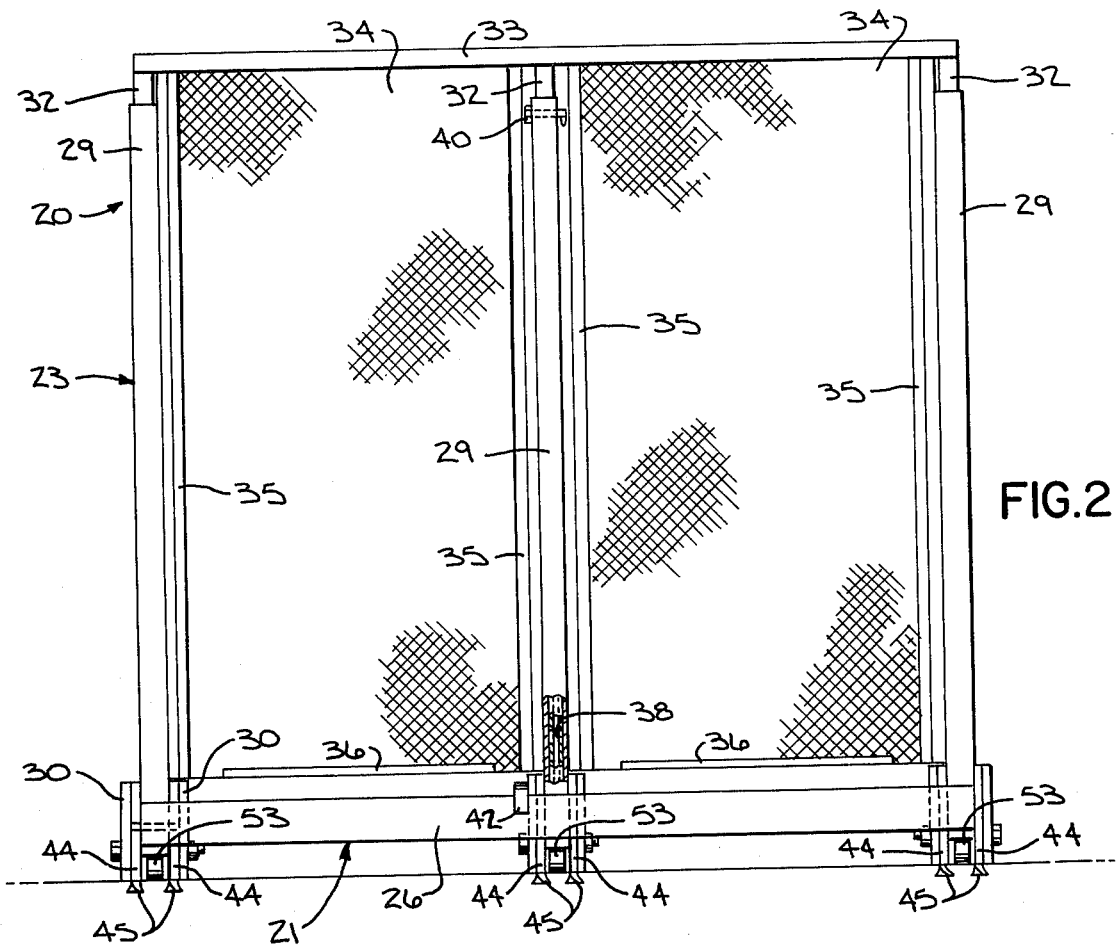
FIG. 2 is a rear elevational view of the cargo retainer of this invention with parts broken away and sectioned.

With reference to FIGS. 1 and 2 wherein the tubular members 29 are disposed in their generally upright position, a tubular post 32 is slidably disposed within each tubular member. The several posts 32 exceed the length of the tubular members 29 and project a relatively short distance beyond the upper or remote ends of members 29. The upper projecting ends of the several posts 32 are connected by a transversely extending box-section member 33 that extends generally over the full width of the upright member 23.

Expanded metal screening 34 extends generally between adjacent pairs of tubular members 29 and is secured at its upper end to the transverse box-section member 33. The transverse dimension of the several screens 34 is somewhat less than the transverse distance between adjacent tubular members 29 with the opposed side edges of each screen being disposed within corresponding U-shaped guides 35 secured longitudinally of the members 29. The length of the screens 34 correspond generally to the length of the tubular posts 32, and the lower edge of each screen is reinforced by a U-shaped reinforcing member 36.

Figure 10:
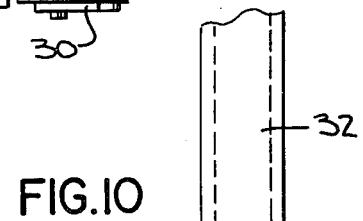
FIG. 10 is an enlarged detail partially in section of the upright member and shows the fastening means for maintaining the upright member in its vertically extended condition.

To accommodate cargo loads that extend to a height exceeding that of the upright member 23, the upright member is vertically extendible as shown by dashed lines and the arrow 37 in FIG. 1. To effect extension of the upright member 23, the connected tubular posts 32 are slidable upwardly within the tubular members 29 with the screens 34 being slidable within the opposed guides 35. Full extension of the upright member 23 is realized when the transversely aligned holes 38 spaced a relatively short distance from the lower end of the central tubular post 32 are aligned with the transversely aligned holes 39 spaced a relatively short distance from the upper end of the central tubular member 29. Fastening means such as a bolt 40 is passed through the aligned holes 38 and 39 to maintain the extended condition of the upright member 23 as generally shown in FIG. 10. The bolt 40 may include a pivotal end portion as generally shown to preclude accidental disengagement. If desired, the central tubular post 32 may be provided with a plurality of longitudinally spaced, transversely aligned holes which may be selectively aligned with holes 39 in the central tubular member 29 to correspondingly vary the height to which the upright member 23 may be extended. In the contracted or nonextended condition of the upright member 23, the central post 32 may be provided with transversely aligned holes that will align with holes 39 in the central tubular member 29 for retention of the bolt 40.

Figure 8:
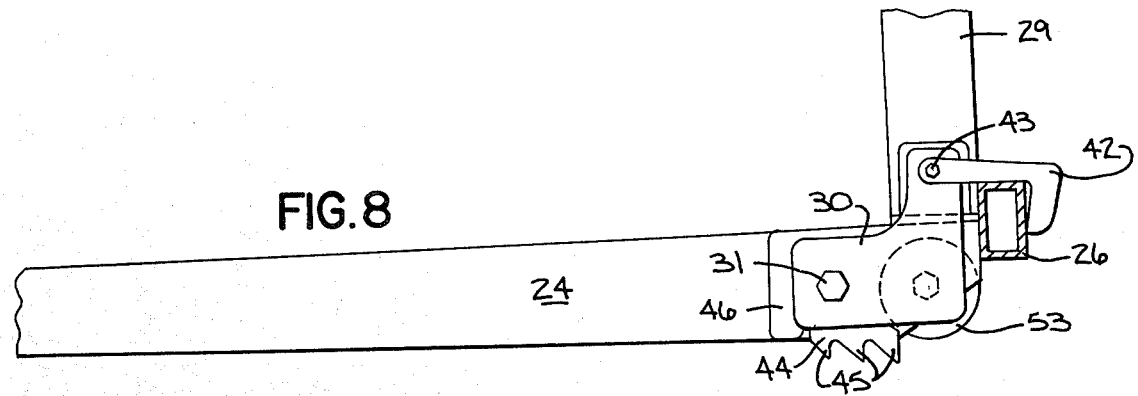
FIG. 8 is a view taken generally on line 8—8 of FIG. 3 and shows the latch means for securing the upright member in the generally upright position.
Figure 9:
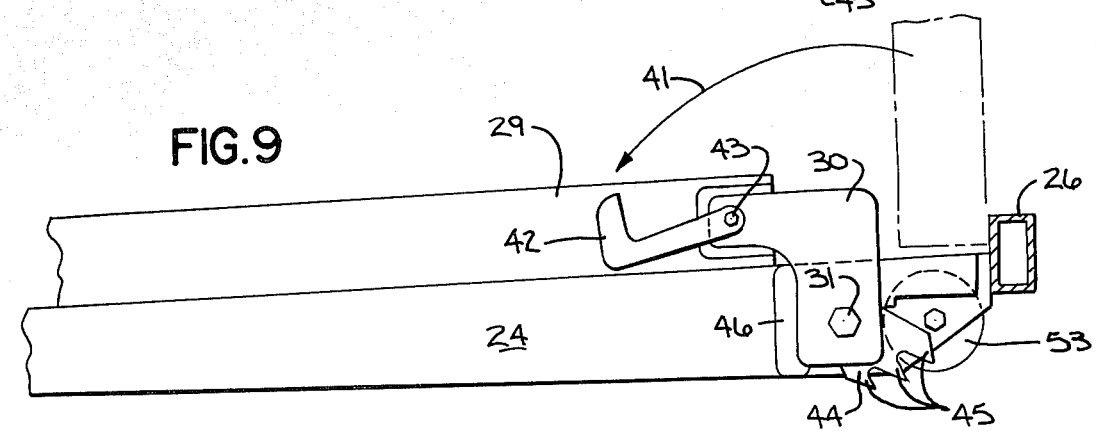
FIG. 9 is a view generally similar to that of FIG. 8 and shows the upright member unlatched and folded down onto the floor contacting member.
Figure 3:
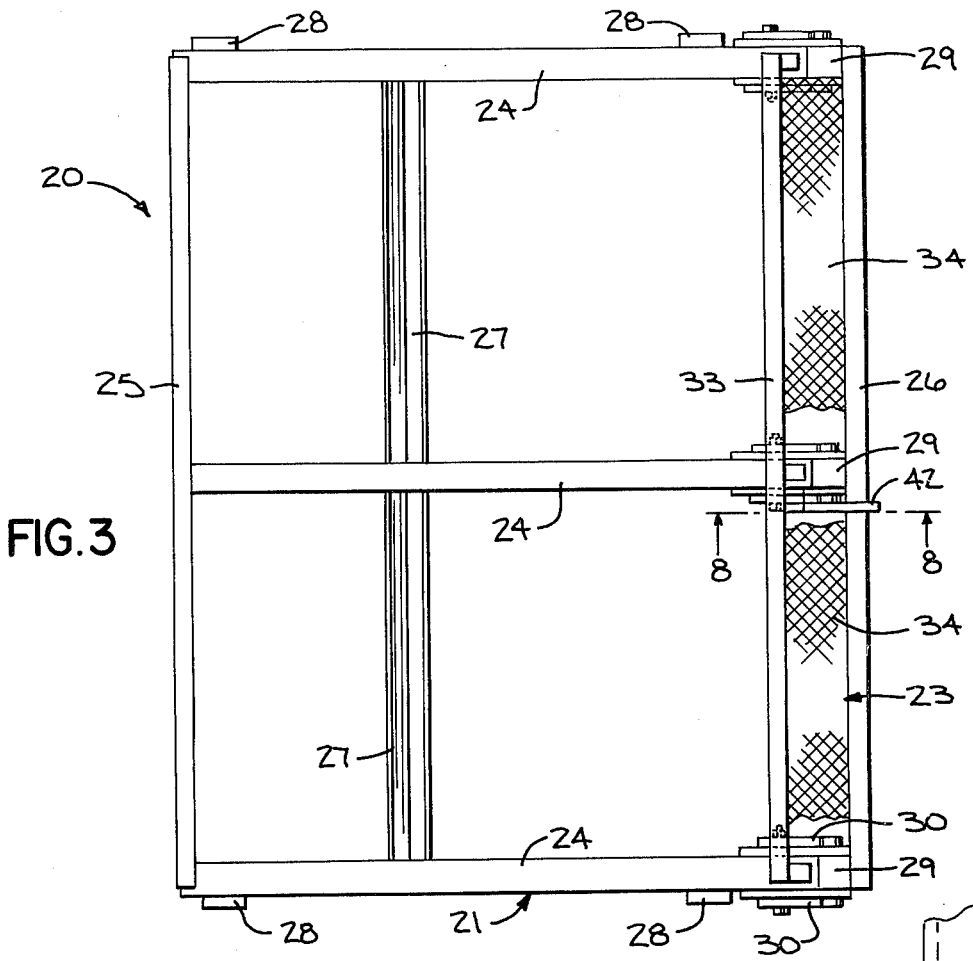
FIG. 3 is a top plan view of the cargo retainer with parts broken away.

As generally shown in FIG. 9, the upright member 23 is foldable down upon the floor contacting member 21 with the plates 30 pivoting on their respective pins 31 and as generally indicated by the arrow 41. In their folded or collapsed condition, the cargo retainers 20 are adapted for stacking to conserve space during storage and deadhead transport. When the cargo retainer 20 is being readied for service, the upright member 23 is unfolded and restored to its upright condition with the lower rear sides of the tubular members 29 generally abutting against the upwardly projecting portion of the box-section brace 26 as generally shown in FIG. 8. The upright condition of member 23 is maintained by a latch 42 pivotally retained at 43 near the bottom of the central tubular member 29 and engageable over the rear box-section brace 26 of the floor contacting member 21.

A pivotal member 44 having teeth 45 for piercing wood floors is disposed on opposed sides of each leg 24 of the floor contacting member 21 and mounted on the common pin 31 with the L-shaped plates 30. A bolster plate 46 is secured on opposed sides of each leg 24 and serves to space the corresponding plates 30 from the leg. The pivotal members 44 are disposed between the leg 24 and the respective plates 30 as perhaps best shown in FIG. 6. So disposed, the corresponding bolster plate 46 serves to limit the movement of the member 44 between the forwardly disposed abutment surface 47 and the rearwardly disposed abutment projection 48. The weight distribution within the pivotal member 44 generally provides that that member will normally assume the position shown in FIG. 4 with the teeth 45 oriented downwardly.

In service, and with the cargo retainer 20 under the weight of the load as generally depicted in FIG. 11, the teeth 45 of pivotal member 44 are driven to penetrate or pierce the wood floor 49 of the truck trailer 50. One of the more severe demands imposed upon the cargo retainers 20 is when the truck trailer 50 is mounted for piggy-back service on a railroad flatcar which may be subjected to impacts from both the front and rear, particularly during humping or freight car sorting procedures. In the case of a rear impact, the teeth 45 having near vertical faces 51 disposed rearwardly, will substantially hold fast in their position to keep the cargo load away from the rear door of the trailer, even while some voids in the load may be created, particularly at the front of the trailer, due to load compaction. In the case of a frontal impact, the angular, forwardly disposed faces 52 of the teeth 45 make dislodgement of the teeth from the floor 49 more readily possible so that the cargo retainer 20 can move forwardly with the load to assume a new position if load compaction results or if existing voids in the load are taken up. Thus, the cargo retainer 20 is generally able to maintain the integrity of the cargo load. As perhaps best shown in FIG. 5, succeeding teeth 45 of the members 44 may be canted or bent oppositely to stagger the gripping pattern of the pivotal members.

When the cargo retainers 20 are seated on a floor out of service, the pivotal members 44 may be caused to assume the phantom line position of FIG. 4 against the rear abutment projection 48 so that the teeth 45 are not unduly worn.

As previously indicated, the cargo retainers 20 are relatively heavy and ordinarily require two (2) people for carrying and stacking. Out of service maneuvering, however, is possible by a single individual. Such maneuvering is made possible by a plurality of transversely spaced and aligned wheels 53 with a single wheel being associated with each leg 24 of the floor contacting member 21 as perhaps best shown in FIG. 2. The wheels 53 are disposed generally rearwardly relative to the pivotal members 44 where the legs 24 terminate in a channel section portion that opens downwardly. As perhaps best shown in FIG. 7, the channel-section leg portion froms a wheel cavity 54 with the corresponding wheel 53 mounted therein on a cross-pin axle 55 supported by the opposed sides of the leg 24. In their mounting, the wheels 53 are spaced slightly above the lower floor contacting surface of the legs 24 as generally shown in FIG. 5. Thus, when the legs 24 of the floor contacting member 21 are at rest on a floor, the wheels 53 remain out of contact with the floor. Only when the forward or remote end of the floor contacting member 21 is raised relative to the floor will the wheels 53 make contact with the floor. As generally shown by dot-dash lines in FIG. 1, wheeled maneuvering is possible by tilting the upright member 23 rearwardly to thereby raise the floor contacting member 21 correspondingly. For the angular disposition of the raised floor contacting member 21 in FIG. 1, the pivotal members 44 are raised out of contact with the floor and only the wheels 53 remain in contact with the floor. In the folded condition of the cargo retainer 20 as shown in FIG. 9, wheeled maneuvering is possible by lifting the forward end of the retainer.

Various modes of carrying out the invention are contemplated as being within the scope of the following claims particularly pointing out and distinctly claiming the subject matter which is regarded as the invention.

I claim:

1. In a device for restraining a cargo load, an elongated floor contacting member provided with an upwardly facing load bearing surface, said member being adapted to project forwardly beneath a portion of the cargo load, a generally upright member secured to the floor contacting member in spaced relation from the forward end of the floor contacting member for engaging with the cargo load, and transversely spaced wheels rotatably mounted adjacent to the rearward end of the floor contacting member, said wheels being out of contact with the floor when the floor contacting member of the restraining device is resting on the floor and being engageable with the floor for wheeled maneuvering of the restraining device when the forward end of the floor contacting member is raised relative to the floor.

2. The structure as set forth in claim 1 wherein the wheels are mounted in wheel cavities at the rearward end of the floor contacting member.

3. The structure as set forth in claim 1 wherein the generally upright member is vertically extendible and fastening means are provided to maintain a selected extension of the upright member.

4. The structure as set forth in claim 1 wherein the lower end of the generally upright member is pivotally mounted adjacent to the rear end of the floor contacting member, said pivotal mounting providing for the collapse of the upright member down onto the floor contacting member, and latch means on said upright member and being engageable over a catch on said floor contacting member to maintain the upright member in its upright condition.

5. The structure as set forth in claim 1 wherein the floor contacting member is provided with a pivotal floor piercing element forwardly of the wheels, said element being lifted out of contact with the floor when the forward end of the floor contacting member is raised for wheeled maneuvering of the restraining device.

6. The structure as set forth in claim 5 wherein the upright member is pivotally mounted adjacent to the rear end of the floor contacting member to render the upright member foldable down onto the floor contacting member, said upright member being pivotal on a common axis with said floor piercing elements.

7. The structure as set forth in claim 1 wherein the opposed sides of the floor contacting member is provided with a pair of fore and aft spaced, outwardly projecting hand holds.

8. The structure as set forth in claim 1 wherein the floor contacting member includes a plurality of transversely spaced, forwardly extending legs with each leg terminating rearwardly with a wheel cavity, each said cavity containing a wheel with the wheel axle pins being axially aligned in a transverse direction and supported by the corresponding leg.

9. The structure as set forth in claim 8 wherein the upright member comprises a plurality of transversely spaced tubular members corresponding to the legs on the floor contacting member, said tubular members being pivotally connected to the corresponding legs of the floor contacting member and being foldable down onto the legs of the floor contacting member to provide for stacking of the collapsed cargo retainers to conserve space during storage and deadhead transport.

10. The structure as set forth in claim 9 wherein the legs of the floor contacting member are connected rearwardly by a transversely extending brace, and latch means are provided on the upright member and are engageable over said brace to maintain the upright member in its upright condition.

11. The structure as set forth in claim 9 wherein a post is slidably disposed within each tubular member of the upright member and a transversely extending member connects the upper end of the posts, said posts and connecting member being vertically extendible relative to the tubular members, and means to secure the posts in their extended condition relative to the tubular members.

12. The structure as set forth in claim 11 wherein screening generally extends between adjacent tubular members and is connected to the transversely extending connecting member for the posts, longitudinally extending guides on said tubular members for slidably receiving the side edges of the screening, said screening being movable with the connected posts relative to the tubular members upon vertical extension of the upright member.

13. The structure as set forth in claim 9 wherein the floor contacting member comprises three transversely spaced legs and the upright member comprises three transversely spaced tubular members.

* * * * *